(12) United States Patent  
Castonguay et al.

(10) Patent No.: US 9,798,698 B2  
(45) Date of Patent: Oct. 24, 2017

(54) SYSTEM AND METHOD FOR MULTI-COLOR DILU PRECONDITIONER

(75) Inventors: Patrice Castonguay, Menlo Park, CA (US); Robert Strzodka, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 367 days.

(21) Appl. No.: 13/584,575

(22) Filed: Aug. 13, 2012

(65) Prior Publication Data

US 2014/0046993 A1 Feb. 13, 2014

(51) Int. Cl.  
*G06F 17/12* (2006.01)

(52) U.S. Cl.  
CPC .................................. *G06F 17/12* (2013.01)

(58) Field of Classification Search  
None  
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,385,363 A | 5/1983 | Widergren et al. |
| 4,583,164 A | 4/1986 | Tolle |
| 4,646,251 A | 2/1987 | Hayes et al. |
| 4,739,495 A | 4/1988 | Levine |
| 4,771,470 A | 9/1988 | Geiser et al. |
| 4,829,465 A | 5/1989 | Knauer |
| 4,920,428 A | 4/1990 | Lin et al. |
| 4,987,496 A | 1/1991 | Greivenkamp, Jr. |
| 5,045,940 A | 9/1991 | Peters et al. |
| 5,130,797 A | 7/1992 | Murakami et al. |
| 5,146,324 A | 9/1992 | Miller et al. |
| 5,175,430 A | 12/1992 | Enke et al. |
| 5,206,822 A | 4/1993 | Taylor |
| 5,261,029 A | 11/1993 | Abi-Ezzi et al. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Tu, C., Liang, J., and Tran, T. "Adaptive Runlength Coding", in IEEE Signal Processing Letters; vol. 10; No. 3; pp. 61-64; Mar. 2003.

(Continued)

*Primary Examiner* — David H Malzahn

(57) ABSTRACT

A system and method for preconditioning or smoothing (e.g., multi-color DILU preconditioning) for iterative solving of a system of equations. The method includes accessing a matrix comprising a plurality of coefficients of a system of equations and accessing coloring information corresponding to the matrix. The method further includes determining a diagonal matrix based on the matrix and the coloring information corresponding to the matrix. The determining of the diagonal matrix may be determined in parallel on a per color basis. The method may further include determining an updated solution to the system of equations where the updated solution is determined in parallel on a per color basis using the diagonal matrix.

19 Claims, 6 Drawing Sheets

(56) References Cited

U.S. PATENT DOCUMENTS

| | | |
|---|---|---|
| 5,285,404 A | 2/1994 | Satou |
| 5,301,136 A | 4/1994 | McMillan, Jr. et al. |
| 5,305,994 A | 4/1994 | Matsui et al. |
| 5,387,982 A | 2/1995 | Kitaura et al. |
| 5,387,983 A | 2/1995 | Sugiura et al. |
| 5,471,412 A | 11/1995 | Shyu |
| 5,475,430 A | 12/1995 | Hamada et al. |
| 5,513,016 A | 4/1996 | Inoue |
| 5,576,958 A | 11/1996 | Kawakatsu et al. |
| 5,596,369 A | 1/1997 | Chau |
| 5,608,824 A | 3/1997 | Shimizu et al. |
| 5,623,311 A | 4/1997 | Phillips et al. |
| 5,652,621 A | 7/1997 | Adams, Jr. et al. |
| 5,659,362 A | 8/1997 | Kovac et al. |
| 5,712,809 A | 1/1998 | Girod et al. |
| 5,734,755 A | 3/1998 | Ramchandran et al. |
| 5,768,429 A | 6/1998 | Jabbi et al. |
| 5,793,433 A | 8/1998 | Kim et al. |
| 5,822,003 A | 10/1998 | Girod et al. |
| 5,870,310 A | 2/1999 | Malladi |
| 5,878,174 A | 3/1999 | Stewart et al. |
| 5,898,881 A | 4/1999 | Miura et al. |
| 5,903,273 A | 5/1999 | Mochizuki et al. |
| 5,905,530 A | 5/1999 | Yokota et al. |
| 5,923,375 A | 7/1999 | Pau |
| 5,995,109 A | 11/1999 | Goel et al. |
| 6,016,474 A | 1/2000 | Kim et al. |
| 6,021,420 A | 2/2000 | Takamuki |
| 6,029,185 A | 2/2000 | Tonomura |
| 6,078,331 A | 6/2000 | Pulli et al. |
| 6,111,988 A | 8/2000 | Horowitz et al. |
| 6,118,547 A | 9/2000 | Tanioka |
| 6,141,740 A | 10/2000 | Mahalingaiah et al. |
| 6,151,457 A | 11/2000 | Kawamoto |
| 6,160,920 A | 12/2000 | Shyu |
| 6,167,092 A | 12/2000 | Lengwehasatit |
| 6,175,430 B1 | 1/2001 | Ito |
| 6,189,021 B1 | 2/2001 | Shyu |
| 6,223,195 B1 | 4/2001 | Tonomura |
| 6,252,611 B1 | 6/2001 | Kondo |
| 6,256,038 B1 | 7/2001 | Krishnamurthy |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,356,945 B1 | 3/2002 | Shaw et al. |
| 6,392,216 B1 | 5/2002 | Peng-Tan |
| 6,396,397 B1 | 5/2002 | Bos et al. |
| 6,421,695 B1 | 7/2002 | Bae et al. |
| 6,438,664 B1 | 8/2002 | McGrath et al. |
| 6,445,829 B1 | 9/2002 | Shyu |
| 6,459,738 B1 | 10/2002 | Wu et al. |
| 6,486,971 B1 | 11/2002 | Kawamoto |
| 6,584,202 B1 | 6/2003 | Montag et al. |
| 6,683,643 B1 | 1/2004 | Takayama et al. |
| 6,707,452 B1 | 3/2004 | Veach |
| 6,724,423 B1 | 4/2004 | Sudo |
| 6,724,932 B1 | 4/2004 | Ito |
| 6,737,625 B2 | 5/2004 | Baharav et al. |
| 6,751,721 B1 | 6/2004 | Webb, Jr. et al. |
| 6,760,080 B1 | 7/2004 | Moddel et al. |
| 6,785,814 B1 | 8/2004 | Usami et al. |
| 6,799,192 B1 | 9/2004 | Handley |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 6,996,645 B1 | 2/2006 | Wiedenman et al. |
| 7,007,054 B1 | 2/2006 | Brady et al. |
| 7,009,639 B1 | 3/2006 | Une et al. |
| 7,015,909 B1 | 3/2006 | Morgan, III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,142,720 B1 | 11/2006 | Fukuda et al. |
| 7,221,779 B2 | 5/2007 | Kawakami et al. |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,403,564 B2 | 7/2008 | Laksono |
| 7,486,844 B2 | 2/2009 | Chang et al. |
| 7,502,505 B2 | 3/2009 | Malvar et al. |
| 7,580,070 B2 | 8/2009 | Yanof et al. |
| 7,626,612 B2 | 12/2009 | John et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,792,891 B2 | 9/2010 | Vainsencher et al. |
| 7,817,187 B2 | 10/2010 | Silsby et al. |
| 7,859,568 B2 | 12/2010 | Shimano et al. |
| 7,860,382 B2 | 12/2010 | Grip |
| 8,238,695 B1 | 8/2012 | Davey et al. |
| 8,373,718 B2 | 2/2013 | Dutta et al. |
| 8,423,597 B1 | 4/2013 | Ho et al. |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0015445 A1 | 2/2002 | Hashimoto |
| 2002/0018244 A1 | 2/2002 | Namizuka et al. |
| 2002/0025002 A1 | 2/2002 | Her |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0041626 A1 | 4/2002 | Yoshioka et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0118743 A1 | 8/2002 | Jiang |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0078952 A1 | 4/2003 | Kim et al. |
| 2003/0122825 A1 | 7/2003 | Kawamoto |
| 2003/0141434 A1 | 7/2003 | Ishikawa et al. |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0218672 A1 | 11/2003 | Zhang et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0178974 A1 | 9/2004 | Miller et al. |

(56) References Cited

U.S. PATENT DOCUMENTS

| | | |
|---|---|---|
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0175257 A1 | 8/2005 | Kuroki |
| 2005/0185058 A1 | 8/2005 | Sablak |
| 2005/0213128 A1 | 9/2005 | Imai et al. |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0119710 A1 | 6/2006 | Ben-Ezra et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0268180 A1 | 11/2006 | Chou |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0002165 A1 | 1/2007 | Parks |
| 2007/0091188 A1 | 4/2007 | Chen et al. |
| 2007/0139405 A1 | 6/2007 | Marcinkiewicz |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2008/0030587 A1 | 2/2008 | Helbing |
| 2008/0062164 A1 | 3/2008 | Bassi et al. |
| 2008/0218599 A1 | 9/2008 | Klijn et al. |
| 2008/0231726 A1 | 9/2008 | John |
| 2008/0303918 A1 | 12/2008 | Keithley |
| 2009/0002517 A1 | 1/2009 | Yokomitsu et al. |
| 2009/0010539 A1 | 1/2009 | Guarnera et al. |
| 2009/0116750 A1 | 5/2009 | Lee et al. |
| 2009/0160957 A1 | 6/2009 | Deng et al. |
| 2009/0257677 A1 | 10/2009 | Cabral et al. |
| 2009/0295941 A1 | 12/2009 | Nakajima et al. |
| 2010/0266201 A1 | 10/2010 | Cabral et al. |
| 2010/0309333 A1 | 12/2010 | Smith et al. |
| 2011/0074980 A1 | 3/2011 | Border et al. |
| 2011/0096190 A1 | 4/2011 | Silverstein et al. |
| 2011/0122273 A1 | 5/2011 | Kanemitsu et al. |
| 2012/0019569 A1 | 1/2012 | Byun |
| 2012/0022841 A1* | 1/2012 | Appleyard ............... 703/2 |
| 2012/0293472 A1 | 11/2012 | Wong et al. |
| 2013/0050165 A1 | 2/2013 | Northway et al. |
| 2013/0083216 A1 | 4/2013 | Jiang et al. |
| 2013/0086137 A1* | 4/2013 | Wang et al. ............. 708/446 |
| 2013/0212094 A1 | 8/2013 | Naguib et al. |
| 2013/0242133 A1 | 9/2013 | Li |
| 2014/0046993 A1* | 2/2014 | Castonguay et al. ...... 708/446 |
| 2014/0063300 A1 | 3/2014 | Lin et al. |
| 2014/0071102 A1 | 3/2014 | Pieper et al. |
| 2014/0125836 A1 | 5/2014 | Pieper |
| 2015/0002692 A1 | 1/2015 | Cabral et al. |
| 2015/0002693 A1 | 1/2015 | Cabral et al. |
| 2015/0130967 A1 | 5/2015 | Pieper |
| 2016/0037044 A1 | 2/2016 | Motta et al. |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 9827742 | 6/1998 |
| WO | 03043308 | 5/2003 |
| WO | WO03043308 | 5/2003 |
| WO | 2004063989 | 7/2004 |
| WO | 2007056459 | 5/2007 |
| WO | 2007093864 | 8/2007 |

OTHER PUBLICATIONS

The Merriam-Webster Dictionary. 2005 ed. Springfield, MA: Merriam-Webster Inc., 2005.

Park, S., Kim, S., Kim, I., Byun K., Cha, J.J., Cho, H., "A Single-Chip Video/Audio Codec for Low Bit Rate Application"; ETRI Journal, vol. 22; No. 1; Mar. 2000; pp. 20-29.

Chen, T.; Huang Y.; Chen L.; "Analysis and Design of Macroblock Pipelining for H.264/AVC VLSI Architecture"; Circuits and Systems, 2004. ISCAS '04; Proceedings of the 2004 International Symposium on vol. 2; No., pp. II-273-6; vol. 2 May 23-26, 2004.

Naganuma, I., et al.; "Single-Chip MPEG-2 422P@HL CODEC LSI with Multi-Chip Configuration for Large Scale Processing Beyond HDTV Level", Design, Automation and Test in Europe Conference and Exhibition, Mar. 2003.

Mizuno, M. et al.; "A 1.5 W Single-Chip MPEG-2 MP@ML Video Encoder With Low Power Motion Estimation and Clocking", Solid State Circuits, IEEE Journal of, vol. 32, No. 11, pp. 1807-1816, Nov. 1997.

Wang, Shih-Hao; et al., "A Platform-Based MPEG-4 Advanced Video Coding (AVC) Decoder With Block Level Pipelining", Information, Communications and Signal Processing, 2003 and the Fourth Pacific Rim Conference on Multimedia. Proceedings of the 2003 Joint Conference of the Fourth International Conference on vol. 1, No., pp. 51-55 vol. 1; Dec. 2003.

"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. 3 Mar. 2005 pp. 436-444.

"Calibration and removal of lateral chromatic abberation in images" Mallon, et al. Science Direct Copyright 2006; 11 pages.

"Method of Color Interpolation in a Singe Sensor Color Camera Using Green Channel Seperation" Weerasighe, et al Visual Information Processing Lab, Motorola Austrailian Research Center pp. IV-3233-IV3236, 2002.

D. Doo, M. Sabin "Behaviour of recrusive division surfaces near extraordinary points"; Sep. 197; Computer Aided Design; vol. 10, pp. 356-360.

D.W.H. Doo; "A subdivision algorithm for smoothing down irregular shaped polyhedrons"; 1978; Interactive Techniques in Computer Aided Design; pp. 157-165.

(56) References Cited

OTHER PUBLICATIONS

Davis, J., Marschner, S., Garr, M., Levoy, M., Filling holes in complex surfaces using volumetric diffusion, Dec. 2001, Stanford University, pp. 1-9.
Donald D. Spencer, "Illustrated Computer Graphics Dictionary", 1993, Camelot Publishing Company, p. 272.
E. Catmull, J. Clark, "recursively enerated B-Spline surfaces on arbitrary topological meshes"; Nov. 1978; Computer aided design; vol. 10; pp. 350-355.
gDEBugger, graphicRemedy, http://www.gremedy.com, Aug. 8, 2006, pp. 1-18.
http://Slashdot.org/articles/07/09/06/1431217.html.
J. Bolz, P. Schroder; "rapid evaluation of catmull-clark subdivision surfaces"; Web 3D '02.
J. Stam; "Exact Evaluation of Catmull-clark subdivision surfaces at arbitrary parameter values"; Jul. 1998; Computer Graphics; vol. 32; pp. 395-404.
Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.
Ko et al., "Fast Digital Image Stabilizer Based on Gray-Coded Bit-Plane Matching", IEEE Transactions on Consumer Electronics, vol. 45, No. 3, pp. 598-603, Aug. 1999.
Ko, et al., "Digital Image Stabilizing Algorithms Basd on Bit-Plane Matching", IEEE Transactions on Consumer Electronics, vol. 44, No. 3, pp. 617-622, Aug. 1988.
Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.
Kumar, S., Manocha, D., Interactive display of large scale trimmed NURBS models, 1994, University of North Carolina at Chapel Hill, Technical Report, p. 1-36.
Kuno et al. "New Interpolation Method Using Discriminated Color Correlation for Digital Still Cameras" IEEE Transac. on Consumer Electronics, vol. 45, No. 1, Feb. 1999, pp. 259-267.
Loop, C., DeRose, T., Generalized B-Spline surfaces o arbitrary topology, Aug. 1990, SIGRAPH 90, pp. 347-356.
M. Halstead, M. Kass, T. DeRose; "efficient, fair interolation using catmull-clark surfaces"; Sep. 1993; Computer Graphics and Interactive Techniques, Proc; pp. 35-44.
Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.
Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.
Parhami, Computer Arithmetic, Oxford University Press, Jun. 2000, pp. 413-418.
S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
S. Erturk, "Real-Time Digital Image Stabilization Using Kalman Filters", http://www,ideallibrary.com, Real-Time Imaging 8, pp. 317-328, 2002.
T. DeRose, M., Kass, T. Troung; "subdivision surfaces in character animation"; Jul. 1998; Computer Graphics and Interactive Techniques, Proc; pp. 85-94.
Uomori et al., "Automatic Image Stabilizing System by Full-Digital Signal Processing", vol. 36, No. 3, pp. 510-519, Aug. 1990.
Uomori et al., "Electronic Image Stabiliztion System for Video Cameras and VCRs", J. Soc. Motion Pict. Telev. Eng., vol. 101, pp. 66-75, 1992.
http:englishrussia.com/p=1377; Oct. 1, 2007; 2 Pages.
http://en.wikipedia.org/wiki/L*a*b*; "Lab Color Space"; Wikipedia, the free encyclopedia; May 13, 2010; pp. 1-4.
http://en.wikipedia.org/wiki/Half_tone; "Halftone"; Wikipedia, the free encyclopedia; May 13, 2010; pp. 1-5.
http://en.wikipedia.org/wiki/Demosaicing; "Demosaicing"; Wikipedia, the free encyclopedia; May 13, 2010; pp. 1-5.
http://en.wikipedia.org/wiki/Color_filter_array; "Color Filter Array"; Wikipedia, the free encyclopedia; May 17, 2010; pp. 1-5.
http://en.wikipedia.org/wiki/Bayer_filter; "Bayer Filter"; Wikipedia, the free encyclopedia; May 14, 2010; pp. 1-4.
http://en.wikipedia.org/wiki/Color_space; "Color Space"; Wikipedia, the free encyclopedia; May 10, 2014; pp. 1-4.
Duca et al., "A Relational Debugging Engine for Graphics Pipeline, International Conference on Computer Graphics and Interactive Techniques", ACM SIGGRAPH Jul. 2005, pp. 453-463.
http://en.wikipedia.org/wiki/Color_translation; "Color Management"; Wikipedia, the free encyclopedia; May 14, 2010; pp. 1-4.

\* cited by examiner

400

SYSTEM AND METHOD FOR MULTI-COLOR DILU PRECONDITIONER

FIELD OF THE INVENTION

Embodiments of the present invention are generally related to solving linear systems of equations.

BACKGROUND OF THE INVENTION

As computer systems have advanced, processing power and speed have increased substantially. Computer systems have thus been able to solve increasing complicated problems. Iterative methods for solving large sparse linear systems of equations have become popular in many areas of scientific computing. Although direct solution methods have long been preferred because of their robustness and predictable behavior, the development of new efficient iterative solvers and the increased need for solving very large systems have caused iterative solvers to become the method of choice for solving sparse linear systems.

A wide variety of iterative algorithms exist to solve sparse linear systems of equations including stationary iterative methods (such as Jacobi, Gauss-Seidel, Successive Over-Relaxation (SOR)), Krylov subspace methods (such as Conjugate Gradient (CG), Bi-Conjugate Gradient (BiCG), Generalized Minimal Residual Method (GMRES)) and Algebraic MultiGrid (AMG) methods. Krylov subspace methods and AMG methods have been the most popular iterative methods to solve sparse linear systems arising from partial differential equations (PDEs) because of their robustness and efficiency. Unfortunately, these iterative algorithms can be sequential in nature. This sequential nature results from the dependencies between computations and thereby results in increased computation time as each computation is dependent upon the needs results from proceeding computations.

Thus, while iterative algorithms are desirable over direct solving methods because of their efficiency, the sequential nature of the computations limits performance and time saved.

SUMMARY OF THE INVENTION

Accordingly, what is needed is an efficient preconditioner or smoother that is parallel in nature thereby allowing efficient solving of systems of equations using iterative methods. Embodiments of the present invention implement a multi-color DILU preconditioner that is suitable for implementation on a parallel hardware architecture (e.g., GPU). Embodiments of the present invention are operable to use coloring to extract parallelism in a DILU smoother or preconditioner. Embodiments of the present invention are further operable to perform the multi-color DILU preconditioning in parallel thereby advantageously providing significantly enhanced performance over traditional ILU preconditioners which are difficult to parallelize. The parallelism of embodiments of the present invention advantageously allows faster completion of preconditioning or smoothing over sequential methods. Embodiments of the present invention further advantageously provide a multi-color DILU preconditioner that is strong, parallel, requires very low storage, and computationally inexpensive.

In one embodiment, the present invention is directed toward a method for preconditioning. The method includes accessing a matrix comprising a plurality of coefficients of a system of equations and accessing coloring information corresponding to the matrix. The method further includes determining a diagonal matrix based on the matrix and the coloring information corresponding to the matrix. The determining of the diagonal matrix may be determined in parallel on a per color basis. The determining of the diagonal matrix may be performed on a parallel hardware architecture (e.g., a graphics processing unit (GPU)). The method may further include accessing an initial solution and determining a preconditioning matrix based on the diagonal matrix (e.g., an incomplete lower and upper triangular decomposition with only diagonal modified (DILU) preconditioner). The method may further include determining an updated solution to the system of equations. In one embodiment, the updated solution is determined in parallel on a per color basis.

In one embodiment, the present invention is implemented as a system for preconditioning. The system includes a matrix access module operable to access a matrix corresponding to a system of equations and a coloring access module operable to access color information corresponding to the matrix. In one embodiment, the matrix corresponds to a plurality of coefficients of the system of equations. The system further includes a diagonal matrix determination module operable for determining a diagonal matrix based on the color information corresponding to the matrix in parallel on a per color basis. In one embodiment, the diagonal matrix is used to construct a preconditioner matrix that comprises the product of lower and upper triangular matrices. The diagonal matrix may be determined by a graphical processing unit (GPU).

The system may further include a solution access module operable for accessing an initial solution to the system of equations and an updated solution determination module operable for determining an updated solution based on the matrix, the initial solution, and the color information. In one embodiment, the determining of the updated solution is determined in parallel based on a per color basis. In one exemplary embodiment, the updated solution module is operable to determine the updated solution based on a lower triangular solving phase and an upper triangular solving phase. The determining of the updated solution may be determined by a GPU.

In another embodiment, the present invention is directed to a method for solving a system of equations. The method includes accessing a matrix comprising coefficients of a system of equations and accessing coloring information corresponding to the matrix. The method further includes determining a diagonal matrix based on the coloring information and the matrix. In one embodiment, the determining of the diagonal matrix is computed in parallel (e.g., by a GPU) for each respective color of the coloring information. The method further includes determining an updated solution to the system of equations. In one embodiment, the determining of the updated solution is based on an incomplete lower and upper triangular decomposition with only diagonal modified (DILU) preconditioner performed by a graphics processing unit (GPU) and the updated solution is computed in parallel on a per color basis. The determining of the updated solution may be based on an initial solution, the matrix, and the diagonal matrix. In one exemplary embodiment, the updated solution is determined based on a lower triangular solving phase and an upper triangular solving phase. In another embodiment, the updated solution is determined based on a common sparse matrix vector multiplication function. The determining of the updated solution may be a portion of an algebraic multigrid (AMG) iterative method.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
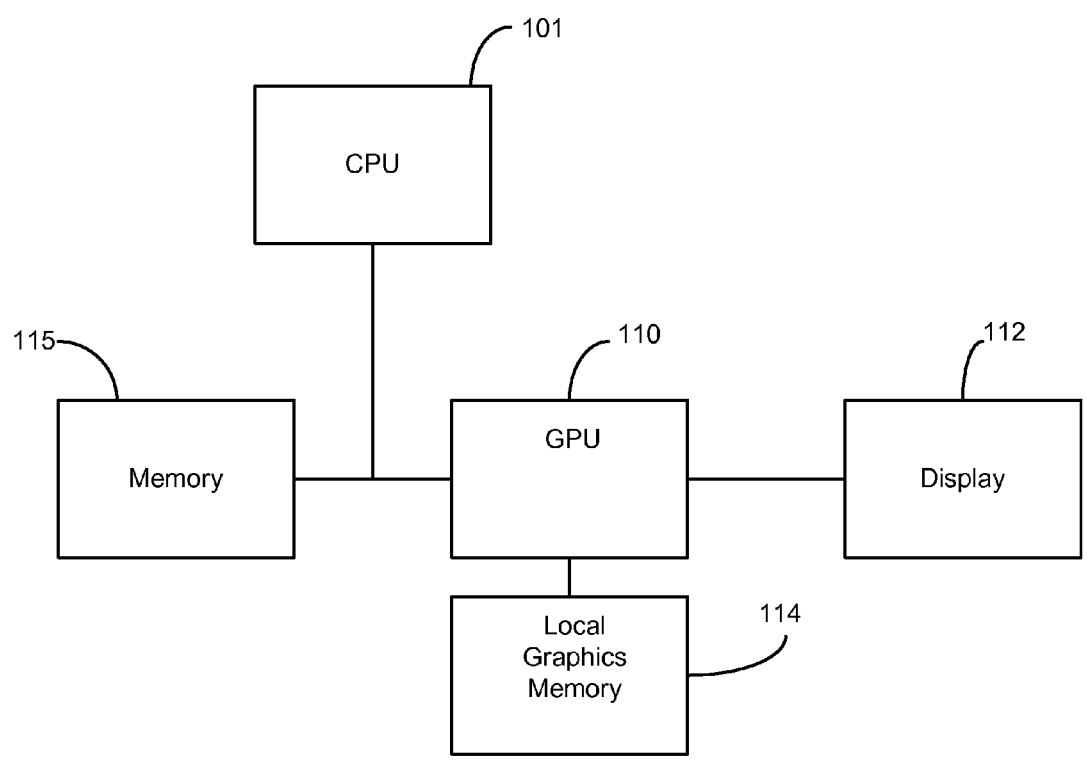
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Environment

FIG. 1 shows an exemplary computer system 100 in accordance with one embodiment of the present invention. Computer system 100 depicts the components of a generic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

In one exemplary embodiment, GPU 110 is operable for General-purpose computing on graphics processing units (GPGPU) computing. GPU 110 may execute Compute Unified Device Architecture (CUDA) programs and Open Computing Language (OpenCL) programs. GPU 110 may thus be used for a variety of computing applications including simulations of molecular dynamics, computational fluid dynamics, reservoir simulations, and finite structural problems. It is appreciated that the parallel architecture of GPU 110 may have significant performance advantages over CPU 101.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Exemplary Systems and Methods for Multi-Color DILU Preconditioner

Embodiments of the present invention implement a multi-color DILU preconditioner that is suitable for implementation on a parallel hardware architecture (e.g., GPU). Embodiments of the present invention are operable to use coloring to extract parallelism in a DILU smoother or preconditioner. Embodiments of the present invention are further operable to perform the multi-color DILU preconditioning in parallel thereby advantageously providing significantly enhanced performance over traditional ILU preconditioners which are difficult to parallelize. The parallelism of embodiments of the present invention advantageously allows faster completion of preconditioning or smoothing over sequential methods. Embodiments of the present invention further advantageously provide a multi-color DILU preconditioner that is strong, parallel, requires very low storage, and computationally cheap. The low-storage of embodiments of the present invention advantageously allows for the solution of larger systems of equations on a system with finite amount of memory.

Embodiments of the present invention further provide an efficient preconditioner or smoother operable for use with a variety of iterative methods (e.g., iterative methods that utilize preconditioners or smoothers). Embodiments of the present invention are operable for use with a variety of simulations including molecular dynamics, computational fluid dynamics, reservoir simulations and finite structural problems. For example, in a fluid flow simulation, the system of equations may be used to predict how a fluid behaves as the fluid flows over an object.

Preconditioning

The efficiency and robustness of iterative methods (e.g., Krylov subspace iterative methods) can be improved by using a preconditioner. Preconditioning is a way to transform the original linear system into one which has the same solution, but which is likely to be easier to solve with an iterative solver. In general, the reliability of iterative techniques, when dealing with various applications, depends much more on the quality of the preconditioner than on the particular iterative method used. Popular preconditioners include stationary iterative methods such as Jacobi and Gauss-Seidel and incomplete (LU) factorization methods (hereinafter ILU preconditioners). It is noted that LU and ILU factorization factorizes a matrix as the product of a lower triangular matrix and an upper triangular matrix.

In the context of algebraic multigrid (AMG) methods, the preconditioner may be used as a smoother, whose objective is to damp the oscillatory components of the error. It is appreciated that good preconditioners are generally good smoothers in the context of AMG methods. It is further appreciated that an efficient preconditioner or smoother is one that requires low storage, facilitates reduction of the number of iterations of the iterative solver (e.g., Krylov subspace method or AMG method) and is computational cheap.

ILU(0) Preconditioner

Embodiments of the present invention are described herein with reference to exemplary sparse linear system Ax=b. It is noted the exemplary sparse linear system Ax=b is used for explanatory purposes. It is further noted that embodiments of the present invention are operable for use with linear systems of equations (e.g., sparse linear system of equations) and not intended to be limited. For example, in the smoothing step of an AMG algorithm, the solution is updated using the preconditioning matrix M as follows:

$$x_{k+1} = x_k + M^{-1}(b - Ax_k),$$

where $x_{k+1}$ is the updated solution, $x_k$ is the initial or previously updated solution, M is the preconditioning matrix, b is a vector, and A is a matrix.

For the preconditioner to be computationally cheap, the preconditioning matrix M needs to be easily invertible. In an ILU preconditioner, $M = \bar{L}\bar{U}$ where $\bar{L}$ is a sparse lower triangular matrix and $\bar{U}$ is a sparse upper triangular matrix such that the residual matrix $R = \bar{L}\bar{U} - A$ satisfies certain constraints (e.g., having zero entries in some locations). The ILU factorization technique with no fill-in, denoted by ILU(0) is probably the most popular ILU preconditioner. In the ILU(0) preconditioner, $M = \bar{L}\bar{U}$, where $\bar{L}$ is a sparse lower triangular matrix with the same non-zero structure as the lower part of A, $\bar{U}$ is a sparse upper triangular matrix with the same non-zero structure as the upper part of A, and the entries in the matrix M satisfy $m_{ij} = a_{ij}$ if $a_{ij} \neq 0$.

DILU Preconditioner

It is noted that that the amount of memory required to store the preconditioning matrix M of the ILU(0) preconditioner is the same amount of memory required to store matrix A. To further reduce the memory requirements, a variant of the ILU(0) preconditioner has been proposed, often referred to as a DILU preconditioner. The DILU preconditioner is a form of ILU preconditioners, and hence much better numerically than naïve smoothers (e.g., Jacobi or Gauss-Seidel). In a DILU preconditioner, the preconditioning matrix M has the following form:

$$M = (E+L)E^{-1}(E+U),$$

where L and U are the strict lower and upper triangular parts of A, and E is a diagonal matrix that is constructed such that diag(M)=diag(A).

It can be shown that the DILU preconditioner is equivalent to the ILU(0) preconditioner when the product of the strict-lower part and the strict-upper part of A consists only of diagonal elements and fill-in elements, which is true for example for the standard 5-point difference approximations to second order partial differential operators. The main advantage of the DILU preconditioner over the ILU(0) is that it requires only one extra diagonal of storage (to store that diagonal matrix E).

With the DILU preconditioner, the matrix E can be obtained recursively by realizing that:

$$diag(A)=diag(M)=diag((E+L)E^{-1}(E+U))=diag(E+LE^{-1}U)$$

so that E can be obtained as:

$$E_{11}=A_{11}$$

$$E_{22}=A_{22}-L_{21}E_{11}^{-1}U_{12}$$

$$E_{33}=A_{33}-L_{31}E_{11}^{-1}U_{13}-L_{32}E_{22}^{-1}U_{23}$$

$$E_{44}=A_{44}-L_{41}E_{11}^{-1}U_{14}-L_{42}E_{22}^{-1}U_{24}-L_{43}E_{33}^{-1}U_{34}$$

It is appreciated that the above equations reflect the sequential nature of conventional solutions for determining the diagonal matrix E.

In the smoothing step, since $M=(E+L)E^{-1}(E+U)$ (a LU decomposition of M), the product $$M^{-1}(b-Ax_k)$$

can be obtained by successively solving a lower-triangular system followed by an upper triangular system. In other words, one needs to compute $$z=M^{-1}(b-Ax_k)=(E+U)^{-1}E(E+L)^{-1}(b-Ax_k)$$

which can be obtained by solving
1) Lower triangular solve $$(E+L)y=b-Ax_k$$

2) Upper triangular solve $$(E+U)z=Ey$$

Figure 2:
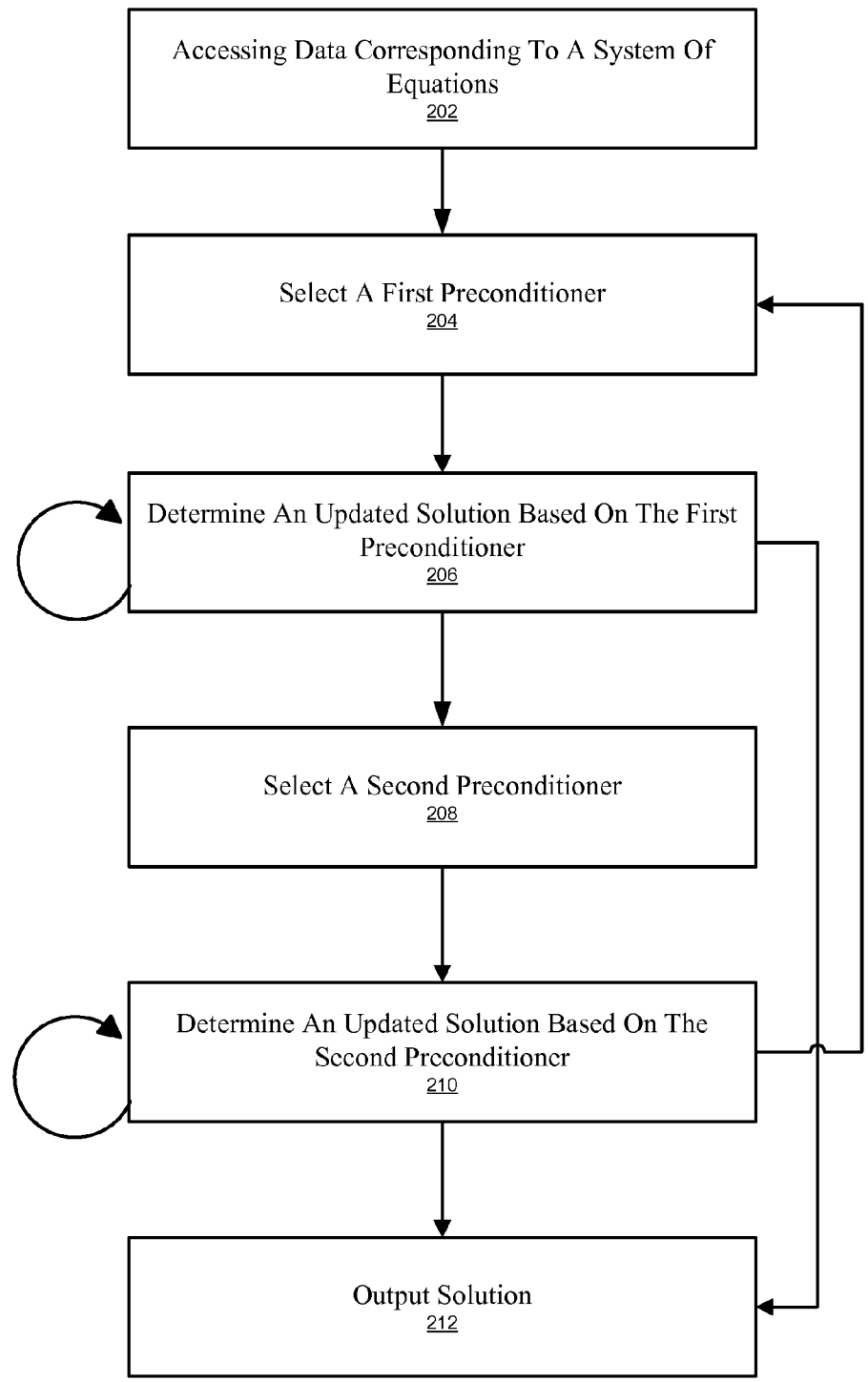
FIG. 2 shows a flowchart of an exemplary electronic component controlled process for solving a system of equations in accordance with one embodiment of the present invention.
Figure 3:
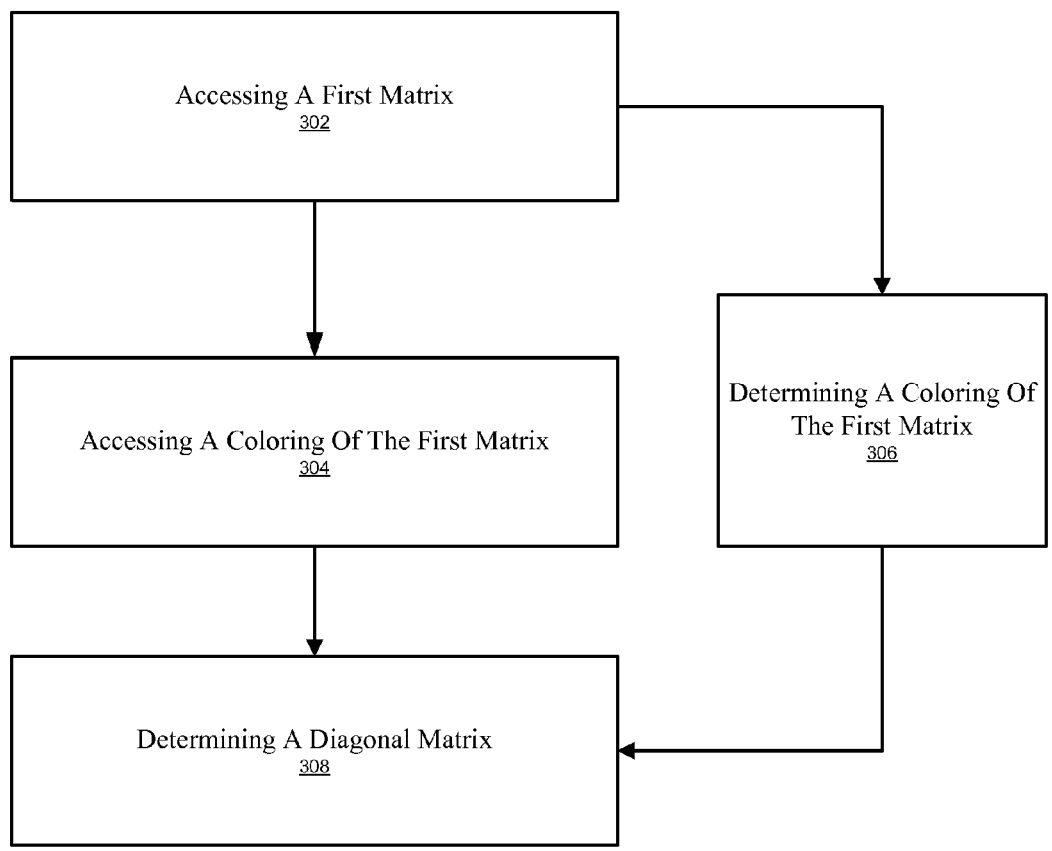
FIG. 3 shows a flowchart of an exemplary electronic component controlled process for setup of a preconditioner in accordance with one embodiment of the present invention.
Figure 5:
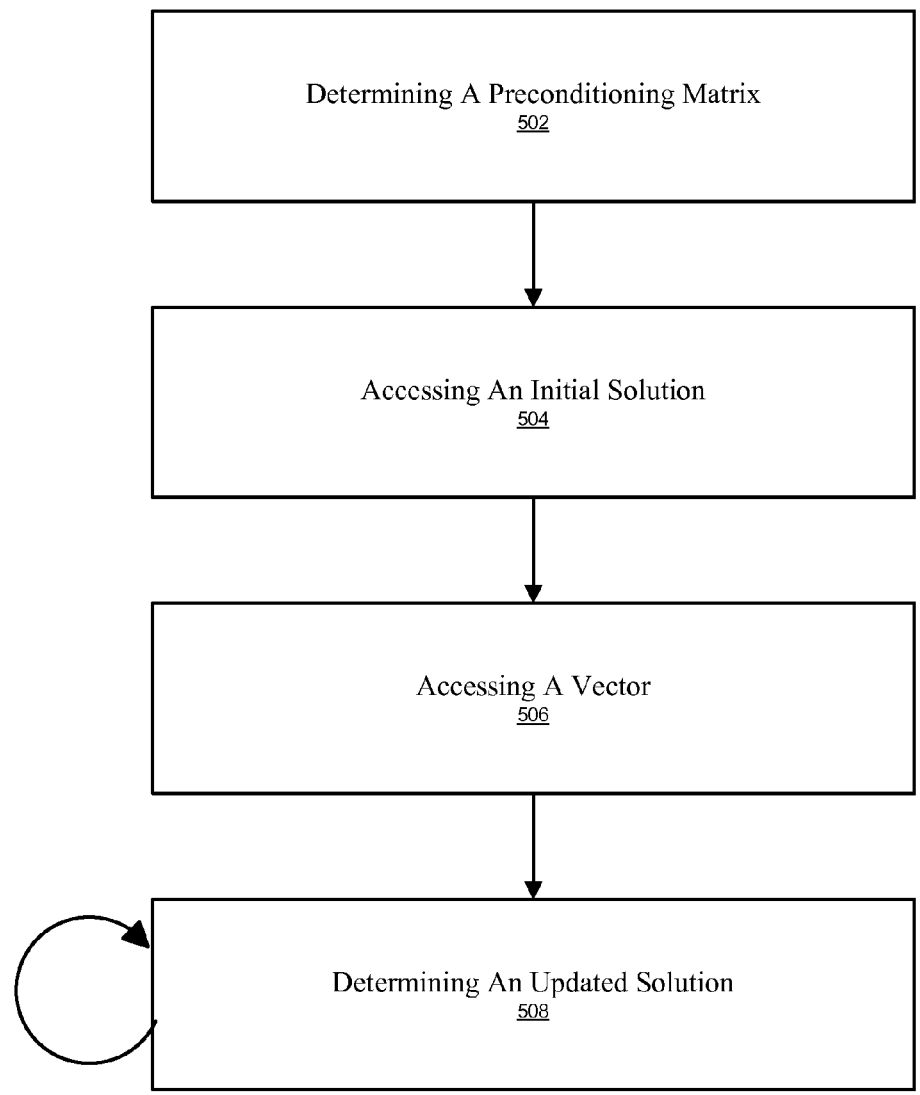
FIG. 5 shows a flowchart of an exemplary electronic component controlled process for updating a solution based on the preconditioner in accordance with one embodiment of the present invention.

With reference to FIGS. 2, 3, and 5, flowcharts 200, 300, and 500 illustrate example functions used by various embodiments of the present invention. Although specific function blocks ("blocks") are disclosed in flowcharts 200, 300, and 500, such steps are examples. That is, embodiments are well suited to performing various other blocks or variations of the blocks recited in flowcharts 200, 300, and 500. It is appreciated that the blocks in flowcharts 200, 300, and 500 may be performed in an order different than presented, and that not all of the blocks in flowcharts 200, 300, and 500 may be performed. Processes 200, 300, and 500 may be used with or as part of a variety of iterative solving methods including, but not limited to, Krylov subspace methods (e.g., Conjugate Gradient (CG), Bi-Conjugate Gradient (BiCG), Generalized Minimal Residual Method (GMRES)) and Algebraic MultiGrid (AMG) methods. Portions of flowcharts 200, 300, and 500 may be performed or executed with a parallel hardware architecture (e.g., a graphics processing unit (GPU)).

FIG. 2 shows a flowchart of an exemplary electronic component controlled process for solving a system of equations in accordance with one embodiment of the present invention. In one embodiment, flowchart 200 depicts a process for using numerical analysis to iteratively solve a system of equations. Portions of Flowchart 200 may be executed by a GPU (e.g., GPU 110). In one exemplary embodiment, embodiments of the present invention are used as a preconditioner to achieve better approximations of updated solutions for numerical analysis.

At block 202, data corresponding to a system of equations is accessed. The data corresponding to the system of equations may be operable for use in solving the system of equations (e.g., a matrix A of the values of coefficients corresponding to the system of equations, a vector x corresponding the unknowns of the system of equations, and the right hand vector b for the linear system of equations Ax=b)

At block 204, a first preconditioner is selected. The first preconditioner may be a multi-color DILU preconditioner, as described herein, or may be any of a variety of preconditioners or smoothers selected based on the iterative method being used.

At block 206, a first updated solution is determined based on the first preconditioner. Block 206 may be performed multiple times thereby using the first preconditioner to determine a plurality of updated solutions, each of which are better approximations or those having less error. Block 212 may be performed based on the updated solution converging to a value within a tolerance.

At block 208, a second preconditioner is selected. The second preconditioner may be a multi-color DILU preconditioner, as described herein, or may be any of a variety of preconditioners or smoothers selected based on the iterative method being used.

At block 210, a second updated solution is determined based on the second preconditioner. Block 210 may be performed multiple times thereby using the updated solution from the first preconditioner to determine further updated solutions which are better approximations or those having less error. Block 204 may be performed for an iterative method that utilizes both the first preconditioner and second preconditioner more than once. Embodiments of the present invention are operable for use with iterative methods that iterate between two or more preconditioners or smoothers.

At block 212, a solution is output. In one embodiment, the solution may be a better approximate solution or updated solution which may be used with other portions of an iterative method (e.g., additional preconditions in process 200). In another embodiment, the solution output may be a final solution to the iterative method. The solution may be output based on a convergence to a solution that falls within some tolerance.

FIG. 3 shows a flowchart of an exemplary electronic component controlled process for setup of a preconditioner in accordance with one embodiment of the present invention. In one embodiment, flowchart 300 depicts a setup phase of Multi Color DILU preconditioner.

Unfortunately, with the DILU preconditioner, the setup phase including the computation of the E matrix is very sequential in nature. Embodiments of the present invention are operable to extract parallelism during the setup phase (e.g. computation of the diagonal matrix E) by using coloring to implicitly renumber the rows (e.g., the order of processing the rows) of the system of equations (e.g., matrix A).

At block 302, a matrix is accessed. In one embodiment, a matrix of the coefficients of the system of equations is accessed (e.g., matrix A for the system Ax=b).

At block 304, a coloring or color information of the matrix is accessed. The coloring of the rows of a matrix (e.g., matrix A) allows the extraction of parallelism in its processing. The coloring is constructed such that different colors are independent and rows of the same color can be computed in parallel. In one embodiment, the coloring may assign a color to each unknown. Since there is a one-to-one relation between the unknowns (e.g., in vector x), the rows, and the columns of matrix A, this means that each row and each column of matrix A is assigned a particular color. The coloring may be used to renumber the rows and columns of the matrix, e.g., typically according to ascending color. For example, the processing order may indicate that first all rows of color 0 are processed then all rows of color 1, etc. and columns are processed in an order such that only columns of a color smaller than the current row color are processed. In this sense a coloring corresponds to an implicit renumbering that can be used as the processing order of the rows and columns of the matrix (e.g., which is not necessarily constructed or stored in memory explicitly). The coloring can be used to reorder the matrix according to this numbering (e.g., to store a reordered matrix). In one embodiment, the coloring information or other coloring information which corresponds to a renumbering of the coefficients of the corresponding systems of equations (e.g., matrix A) facilitates parallel computation of a diagonal matrix (e.g., matrix E). Embodiments of the present invention are operable for accessing coloring information that is determined by an external module.

The color information may include respective colors corresponding to unknowns that can be computed independently. For example, in a 4×4 matrix, rows 1 and 2 may correspond to the color red while rows 3 and 4 may correspond to the color green indicating that rows 1 and 2 can be computed in parallel and rows 3 and 4 can be computed in parallel.

At block 306, a coloring of the matrix is determined. In one exemplary embodiment, a coloring of matrix for the coefficients of the systems of equations is determined. The coloring of the matrix may be determined based on well known coloring methods.

At block 308, a diagonal matrix is determined. The diagonal matrix has non-zero values only on the diagonal of the matrix. In one embodiment, the coloring of the matrix and the matrix (e.g., matrix A) are used to determine a diagonal matrix (e.g., matrix E). Embodiments of the present invention are operable to determine a diagonal matrix (e.g., matrix E) in parallel on a per color basis. The diagonal matrix may be determined via a parallel hardware architecture (e.g., GPU).

Figure 4:
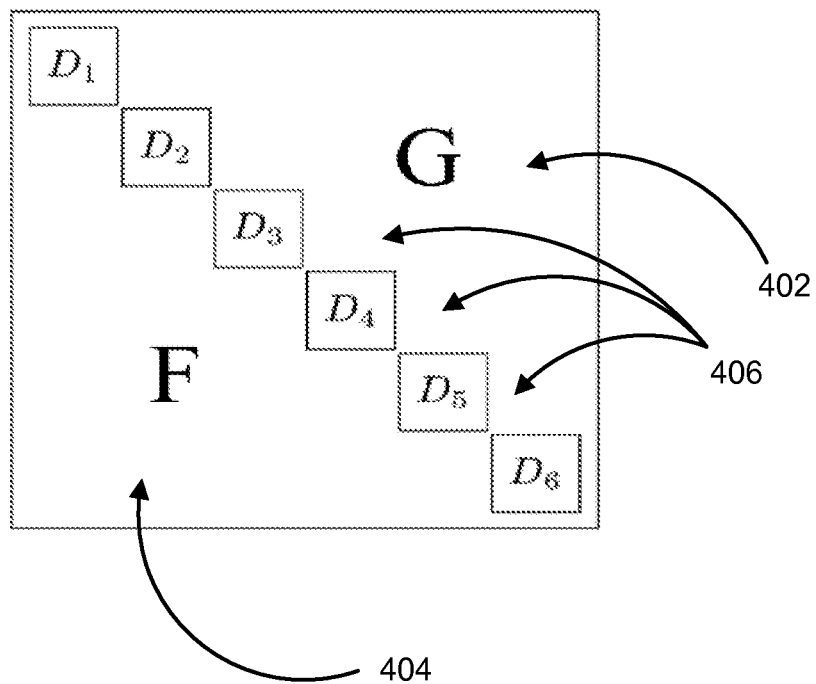
FIG. 4 shows a block diagram of a colored matrix in accordance with one embodiment of the present invention.

FIG. 4 shows a block diagram of a colored matrix in accordance with one embodiment of the present invention. FIG. 4 depicts a matrix (e.g., matrix A) of the coefficients of a linear system with rows and columns reordered based on coloring the unknowns and thereby for parallelism. Matrix 400 includes sparse matrices 402 (e.g., G) and 404 (e.g., F) and diagonal matrices 406 (e.g., $D_1$-$D_6$).

In one embodiment, the amount of parallelism is now of order m/p, where m is the number of rows in A, and p is the number of colors. For example, for a 4×4 matrix, where unknowns 1 and 2 are colored red and unknowns 3 and 4 are colored black the available parallelism is twofold in each color. An exemplary setup phase of the DILU preconditioner would be:

$E_{11} = A_{11}$ $E_{22} = A_{22}$ $E_{33} = A_{33} - L_{31}E_{11}^{-1}U_{13} - L_{32}E_{22}^{-1}U_{23}$ $E_{44} = A_{44} - L_{41}E_{11}^{-1}U_{14} - L_{42}E_{22}^{-1}U_{24}$

Elements $E_{1,1}$ and $E_{2,2}$ can be computed in parallel in the first step and elements $E_{3,3}$ and $E_{2,2}$ can be processed in parallel in the second step. It is appreciated that this can be generalized for multiple colors and multiple unknowns per color. In one embodiment, the matrix is not reordered corresponding to colors, but the above parallel processing still applies according to the implicit renumbering (e.g., the processing order of the matrix performed based on the color and thus with increased parallelism).

In one embodiment, the setup phase is performed by the pseudo code of Table I. The pseudo-algorithms listed herein describe how the "construction" of a preconditioner that can be implemented efficiently on massively parallel devices. It is noted that most research on parallel preconditioners focuses on their application, not their construction. It is appreciated that the pseudo code of Table I is operable for use with a matrix A having entries that are scalar entries or small block entries and is not intended to be limited as such.

TABLE I

Exemplary Setup Phase Pseudo Code

```
setupMulticolorDILU(A, Einv, sorted_rows_by_color, row_colors, n, num_colors) {
/* Inputs:     Matrix A
               Array sorted_rows_by_color (sorted list of
                 rows by color)
               Array row_colors (list storing the color of each
                 row)
               Integer n (size of A)
               Integer num_colors (number of colors used)
   Output:     Diagonal matrix Einv (stores the inverse of
                 the diagonal matrix E) */
   for (c=0; c<num_colors; c++) {
     for (every row i of matrix A with color c) do in parallel {
       Einv_temp = 0;
       for (int j=0;j<n;j++) {
         if (j==i)
           Einv_temp += A[i][i];
         else if (A[i][j] ≠ 0 && row_color[j] < c)
           Einv_temp -= A[i][j]*Einv[j][j]*A[j][i]
       }
       Einv_temp = inverse(Einv_temp);
       Einv[i] = Einv_temp;
     }
   }
}
```

FIG. 5 shows a flowchart of an exemplary electronic component controlled process for updating a solution based on the preconditioner in accordance with one embodiment of the present invention. In one embodiment, flowchart 500 depicts a process for determining an updated solution using a multi-color DILU preconditioner (e.g., a solving portion) based on a diagonal matrix (e.g., matrix E based on A, color information corresponding to A, and vector b for a linear system of equations Ax=b).

At block 502, a preconditioning matrix is determined. In one embodiment, the preconditioning matrix (e.g., matrix M) is determined based on a diagonal matrix (e.g., matrix E) and the matrix of coefficients of systems of equations (e.g., matrix A). The preconditioning matrix may be an incomplete lower and upper triangular decomposition with only diagonal modified (DILU) preconditioner.

At block 504, an initial solution is accessed. The initial solution may be an estimate or guess solution (e.g., x), predetermined value, or fixed value (e.g., zero) for the system of equations. The initial solution may depend on the iterative method being used.

At block 506, a vector is accessed (e.g., vector b). In one embodiment, the vector is a vector from the linear systems of equations (e.g., vector b of system Ax=b).

At block 508, an updated solution is determined. In one embodiment, the updated solution is a new approximate solution that is closer to the exact solution. The updated solution may be determined based on an initial solution, a vector (e.g., the right hand side vector b) a diagonal matrix, a matrix of the coefficients of the system of equations, and color information corresponding to the matrix of the coefficients of the system of equations. The updated solution may be determined based on parallel computation of unknowns of the same color for each color. For example, for a system of equations with a million unknowns and 3 colors, on average ⅓ of the unknowns may be solved for in parallel for each color.

The updated solution may be determined based on an incomplete lower and upper triangular decomposition with only diagonal modified (DILU) preconditioner. The updated solution may be a portion of an algebraic multigrid iterative method to solve a system of equations. In one embodiment, the updated solution is determined based on the equation:

$$x_{k+1} = x_k + M(E)^{-1}(b - Ax_k)$$

Where $x_{k+1}$ is an updated solution (if k is the final iteration then $x_{k+1}$ is the final solution vector from this iterative solver), $x_k$ is an initial solution (e.g., $x_0$) or previously updated solution (e.g., an intermediate solution vector, for iterations k=1, 2, . . . ), M is a preconditioning matrix, E is a diagonal matrix, A is a matrix of coefficients of the system Ax=b. In one embodiment, the goal of the preconditioner is to obtain an updated solution $x_{k+1}$ which is closer to the exact solution to $x = A^{-1}b$, where $A^{-1}$ is the inverse of A.

Embodiments of the present invention are operable, during the smoothing or solving phase, to utilize the coloring information (e.g., corresponding to the matrix of coefficients of the system of equation) to compute an updated solution in parallel on a per color basis. The updated solution may be determined via a parallel hardware architecture (e.g., a GPU). For example, the updated solution may be computed in parallel for each respective color of the coloring information. In one exemplary embodiment, each thread on a GPU is associated with respective row and the GPU can compute each row in parallel by executing each respective thread in parallel.

In one embodiment, the updated solution is determined based on a lower and upper triangular solving phase (e.g., of the smoothing phase). The lower triangular solving phase may be performed by the pseudo code of Table II.

TABLE II

Exemplary Lower Triangular Solving Pseudo Code

```
LowerSolveMulticolorDILU(
    A, Einv, sorted_rows_by_color, row_colors, n, num_colors, x, b, y
) {
/* Inputs:      Matrix A
                Diagonal matrix Einv (stores the inverse of the
                diagonal matrix E)
                Array x
                Array b
                Array row_colors (list storing the color of each
                row)
                Integer n (size of A)
                Integer num_colors (number of colors used)
   Output:      Array y */
for (c=0; c<num_colors; c++) {
    for (every row i of matrix A with color c) do in parallel {
        temp = b[i];
        for (int j=0;j<n;j++) {
            if (A[i][j] ≠ 0) {
                temp -= A[i][j]*x[j];
                if (row_color[j] < c)
                    temp -= A[i][j]*y[j];
```

TABLE II-continued

Exemplary Lower Triangular Solving Pseudo Code

```
            }
        }
        y[i] = Einv[i]*temp;
    }
}
}
```

The upper triangular solving phase may be performed by the pseudo code of Table III.

TABLE III

Exemplary Upper Triangular Solving Pseudo Code

```
UpperSolveMulticolorDILU(
    A, Einv, sorted_rows_by_color, row_colors, n, num_colors, y, z
) {
/* Inputs:      Matrix A
                Diagonal matrix Einv (stores the inverse of the
                diagonal matrix E)
                Array y
                Array row_colors (list storing the color of each
                row)
                Integer n (size of A)
                Integer num_colors (number of colors used)
   Output:      Array z */
for (c=num_colors-1; c>0; c--) {
    for (every row i of matrix A with color c) do in parallel {
        temp = 0.;
        for (int j=0;j<n;j++) {
            if (A[i][j] ≠ 0 && row_color[j] > c) {
                temp += A[i][j]*z[j];
            }
        }
        z[i] = y[i] - Einv[i]*temp;
    }
}
}
```

In another embodiment, the lower and upper triangular solve algorithms can be also expressed with a common sparse matrix vector multiplication function SpMV (scalar a, matrix A, vector x, scalar b, vector y) which performs the operation: y=a*Ax+b*y. The matrix A may be represented by color blocks $A = (A_{c,d})_{c,d}$, with c,d ∈ {0, . . . , num_colors−1}, where $A_{c,d}$ contains all matrix elements A[i][j] for which row i is of color c and column j of color d. In the corresponding vector notation, $v_c$ denotes all vector elements v[i] for which i is of color c. It is noted that with this notation the solve algorithms can be expressed in a more abstract fashion.

The lower triangular solving phase may be performed by the pseudo code of Table IV.

TABLE IV

Exemplary Lower Triangular Solving Pseudo Code

```
LowerSolveMulticolorDILU(A,Einv, n, num_colors, x, b, y) {
/* Inputs:   Matrix A
             Diagonal matrix Einv (stores the inverse of the diagonal
             matrix E)
             Array y
             Array b
             Integer n (size of A)
             Integer num_colors (number of colors used)
   Output:   Array y */
Auxiliary vector v = b;
SpMV(-1, A, x, 1, v);
for (c=0; c<num_colors; c++) {
    if(c>0) SpMV(-1, [A_{c,0}, ..., A_{c,c-1}], y, 0, v_c);
```

TABLE IV-continued

Exemplary Lower Triangular Solving Pseudo Code

SpMV( 1, Einv$_c$, v$_c$, 0, y$_c$);
}

The upper triangular solving phase may be performed by the pseudo code of Table V.

TABLE V

Exemplary Upper Triangular Solving Pseudo Code

UpperSolveMulticolorDILU(A,Einv, n, num_colors, y, z) {
/* Inputs:    Matrix A
              Diagonal matrix Einv (stores the inverse of the diagonal
              matrix E)
              Array y
              Integer n (size of A)
              Integer num_colors (number of colors used)
   Output:    Array z */
Auxiliary vector v;
z = y;
for (c=num_colors-2; c>0; c--) {
    SpMV(1, [A$_{c,c+1}$, ..., A$_{c,num\_colors-1}$], z, 0, v$_c$);
    SpMV(-1, Einv$_c$, v$_c$, 1, z$_c$);
}

These formulations advantageously allow the use of highly optimized sparse matrix vector multiplication functions (SpMV) for certain matrix sizes, types or hardware architectures. In one embodiment, the SpMV functions can be formulated such that the use of the sub-matrices [A$_{c,0}$, ..., A$_{c,c-1}$] and [A$_{c,c+1}$, ..., A$_{c,num\_colors-1}$] does not require their explicit construction, although typical SpMV implementations do not allow operations on a sub-matrix with an arbitrary selection of rows and columns.

In one embodiment, a commonly available four-vector SpMV for CSR (Compressed Sparse Row) and CSC (Compressed Sparse Column) formats could be used to implement the above algorithms. The rows and columns of $\overline{A}$ are sorted by ascending color to obtain a new representation of the matrix denoted by $\overline{A}$ (e.g., stored according to the implicit renumbering based on colors). If matrix $\overline{A}$ is stored as CSR (or CSC) with a values array, a row offset array (or column offset array for CSC) and a column index array (or row index array for CSC), then adding a row end array (or column end array for CSC) allows performance of the SpMV operations on sub-matrices [$\overline{A}_{c,0}$, ..., $\overline{A}_{c,c-1}$] and [$\overline{A}_{c,c+1}$, ..., $\overline{A}_{c,num\_colors-1}$] as four-vector SpMVs (e.g., using the four mentioned arrays) without the need to construct these sub-matrices explicitly.

Block 508 may be performed multiple times, each time based on the previously updated solution determined at each execution of block 508. It is appreciated that the diagonal matrix (e.g., matrix E) may be determined once (e.g., via parallel computation) and used to determine multiple updated solutions. In one embodiment, the diagonal matrix and/or preconditioning matrix can be reused for solving a plurality of systems of equations where matrix of coefficients of the system of equations (e.g., matrix A) is the same while other vectors are different (e.g., for the a plurality of systems represented by Ax$_1$=b$_1$ and Ax$_2$=b$_2$, the A matrix is the same while the x and b vectors vary). As illustrated by flowchart 200, the updated solution may then be passed on to another portion of an iterative solver (e.g., another preconditioner or smoother). Block 508 may be performed multiple times until there is convergence to a solution or may be performed multiple times and used in conjunction with other preconditioners or smoothers as part of an iterative method.

In one embodiment, the preconditioning is part of an algebraic multigrid iterative solver and the preconditioning performed by embodiments of the present invention is operable both as a smoother and coarse grid solver.

Figure 6:
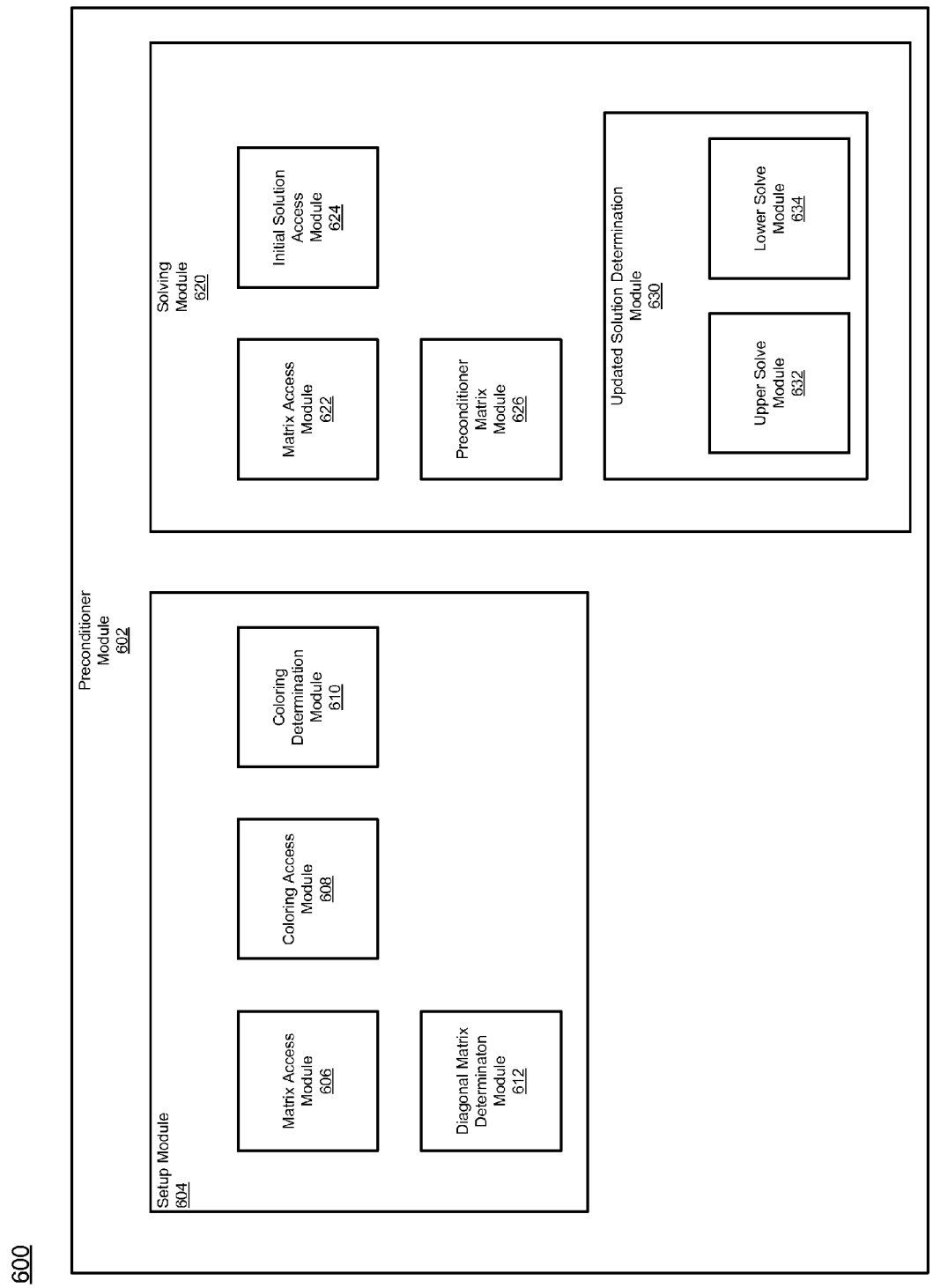
FIG. 6 shows a block diagram of exemplary components of a system in accordance with one embodiment of the present invention.

FIG. 6 illustrates example components used by various embodiments of the present invention. Although specific components are disclosed in system 600, it should be appreciated that such components are examples. That is, embodiments of the present invention are well suited to having various other components or variations of the components recited in system 600. It is appreciated that the components in system 600 may operate with other components than those presented, and that not all of the components of system 600 may be required to achieve the goals of system 600.

FIG. 6 shows a block diagram of exemplary components in accordance with one embodiment of the present invention. System 600 depicts components of a preconditioning module of an iterative solver for solving systems of equations. Preconditioner module 602 includes setup module 604 and solving module 620. System 600 may be used with or as part of a variety of iterative solving methods including, but not limited to, Krylov subspace methods (e.g., Conjugate Gradient (CG), Bi-Conjugate Gradient (BiCG), Generalized Minimal Residual Method (GMRES)) and algebraic multigrid (AMG) methods.

Setup module 604 includes matrix access module 606, coloring access module 608, coloring determination module 610, and diagonal matrix determination module 612. In one embodiment, matrix access module 606 operable to access a matrix corresponding to a system of equations. Coloring access module 608 is operable to access color information corresponding to a matrix (e.g., matrix A). In one embodiment, the matrix (e.g., matrix A) corresponds to a plurality of coefficients of the system of equations. As described herein, the coloring information may include groups of rows or columns that can be used for parallel computations (e.g., the rows or columns are independent and can be computed independently). Optional coloring determination module 610 is operable to determine a coloring of a matrix (e.g., matrix A which corresponds to the coefficients of a system of equations) which can be used to determine a diagonal matrix in parallel on a per color basis.

Diagonal matrix determination module 612 is operable for determining a diagonal matrix based on the color information corresponding to a matrix (e.g., matrix A) in parallel on a per color basis. In one embodiment, the diagonal matrix is operable for computing an incomplete lower and upper triangular decomposition with only diagonal modified (DILU) preconditioner matrix. The diagonal matrix may be determined by a graphical processing unit (GPU).

Solving Module 620 includes matrix access module 622, initial solution access module 624, preconditioner matrix module 626, and updated solution determination module 630. Initial solution access module 624 is operable for accessing an initial solution to the system of equations. Matrix access module 622 is operable to access matrices to be used in solving a system of equations (e.g., matrices b and x for the system Ax=b). Initial solution access module 624 is operable to access an initial solution, as described herein. Preconditioner matrix module 626 is operable to determine a preconditioning matrix (e.g., matrix M), as described herein.

Updated solution determination module 630 is operable for determining an updated solution based on the matrix (e.g., matrix A or matrix of coefficients), an initial solution (e.g., vector $x_0$), color information, and a preconditioning matrix (e.g., matrix M). The updated solution may be determined with use of a parallel hardware architecture (e.g., GPU). In one exemplary embodiment, the determining of the updated solution is determined in parallel on a per color basis.

In one embodiment, updated solution determination module 630 includes upper solve module 632 and lower solve module 634. Upper solve module 632 is operable to determine a portion of the updated solution based on an upper triangular solving phase (e.g., UpperSolveMulticolorDILU( )). Lower solve module 634 is operable to determine a portion of the updated solution based on a lower triangular solving phase (e.g., LowerSolveMulticolorDILU( )).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A non-transitory computer-readable storage medium embodying instructions that, when executed by a processing device, cause the processing device to perform a method for preconditioning, said method comprising:
   accessing a matrix comprising a plurality of coefficients of a system of linear equations;
   accessing coloring information corresponding to said matrix; and
   determining a diagonal matrix of a preconditioning matrix of said matrix based on said matrix and said coloring information corresponding to said matrix, wherein said determining comprises:
      assigning a plurality of execution threads to a plurality of elements of a respective color in said diagonal matrix; and
      computing said plurality of elements of said respective color by executing said plurality of execution threads in said processing device.

2. The non-transitory computer-readable storage medium as described in claim 1, wherein the method further comprises:
   determining said preconditioning matrix based on said diagonal matrix.

3. The non-transitory computer-readable storage medium as described in claim 2 wherein said preconditioning matrix is an incomplete lower and upper triangular decomposition with only diagonal modified (DILU) preconditioner.

4. The non-transitory computer-readable storage medium as described in claim 1 wherein the method further comprises:
   accessing an initial solution.

5. The non-transitory computer-readable storage medium as described in claim 4 wherein the method further comprises:
   determining an updated solution to said system of equations, wherein said updated solution is determined in parallel on a per color basis.

6. The non-transitory computer-readable storage medium as described in claim herein said processing device comprises a graphics processing unit (GPU).

7. A system for preconditioning, said system comprising:
   a processor; and
   memory coupled to said processor and comprising instructions that comprise:
   a matrix access module operable to access a matrix corresponding to a system of equations;
   a coloring access module operable to access color information corresponding to said matrix; and
   a diagonal matrix determination module operable for determining a diagonal matrix based on said color information corresponding to said matrix, wherein said determining comprises:
      assigning a plurality of execution threads to a plurality of elements of a respective color in said diagonal matrix; and
      computing said plurality of elements of said respective color by executing said plurality of execution threads in parallel in said processing device, wherein said diagonal matrix determination module is operable for computing an incomplete lower and upper triangular decomposition with only diagonal modified (DILU) preconditioner matrix.

8. The system as described in claim 7 wherein said diagonal matrix is determined by a graphical processing unit (GPU).

9. The system as described in claim 7 wherein said matrix corresponds to a plurality of coefficients of said system of equations.

10. The system as described in claim 7, wherein said instructions further comprise:
   a solution access module operable for accessing an initial solution to said system of equations.

11. The system as described in claim 10, wherein said instructions further comprise:
   an updated solution determination module operable for determining an updated solution based on said matrix, said initial solution, and said color information, wherein said determining said updated solution is determined in parallel based on a per color basis.

12. The system as described in claim 11 wherein said updated solution module is operable to determine said updated solution based on a lower triangular solving phase and an upper triangular solving phase.

13. The system as described in claim 11 wherein said determining said updated solution is determined by a GPU.

14. A non-transitory computer-readable storage medium embodying instructions that, when executed by a processing device, cause the processing device to perform a method for solving a system of equations, said method comprising:
   accessing a matrix comprising coefficients of a system of equations;
   accessing coloring information corresponding to said matrix, wherein each row of said matrix is assigned with a particular color;
   determining a diagonal matrix of a preconditioning matrix of said matrix, wherein said determining said diagonal matrix comprises:
      assigning a plurality of execution threads to a plurality of elements of a respective color in said diagonal matrix; and computing said plurality of elements of said respective color by executing said plurality of execution threads in parallel in said processing device; and determining an updated solution to said system of equations, wherein said determining said updated solution is based on an incomplete lower and upper triangular decomposition with only diagonal modified (DILU) preconditioner performed by a graphics processing unit (GPU) and said updated solution is computed in parallel on a per color basis.

15. The non-transitory computer-readable storage medium as described in claim 14 wherein said determining of said diagonal matrix is determined by said GPU.

16. The non-transitory computer-readable storage medium as described in claim 14 wherein said determining said updated solution is based on an initial solution, said matrix, and said diagonal matrix.

17. The non-transitory computer-readable storage medium as described in claim 14 wherein said updated solution is determined based on a lower triangular solving phase and an upper triangular solving phase.

18. The non-transitory computer-readable storage medium as described in claim 14 wherein said updated solution is determined based on a common sparse matrix vector multiplication function.

19. The non-transitory computer-readable storage medium as described in claim 14 wherein said determining said updated solution is a portion of an algebraic multigrid iterative process.

* * * * *